United States Patent [19]

Toyooka et al.

[11] Patent Number: 5,284,914
[45] Date of Patent: Feb. 8, 1994

[54] THERMOPLASTIC POLYESTER RESIN COMPOUND

[75] Inventors: Yutaka Toyooka; Masafumi Hongo; Hideyuki Shigemitsu, all of Ohtake, Japan

[73] Assignee: Mitsubishi Rayon Co., Ltd., Tokyo, Japan

[21] Appl. No.: 692,782

[22] Filed: Apr. 26, 1991

Related U.S. Application Data

[63] Continuation of Ser. No. 418,798, Oct. 4, 1989, abandoned, which is a continuation of Ser. No. 189,246, Mar. 21, 1988, abandoned.

Foreign Application Priority Data

Dec. 8, 1986 [JP] Japan ................................ 61-292052
Jul. 16, 1987 [JP] Japan ................................ 62-177845

[51] Int. Cl.$^5$ .................... C08L 51/04; C08L 67/03; C08L 69/00; C08L 71/12
[52] U.S. Cl. ................................ 525/67; 525/64; 525/68; 525/133; 525/146; 525/152
[58] Field of Search ............... 525/67, 905, 68, 64, 525/133, 146, 152

[56] References Cited

U.S. PATENT DOCUMENTS

| | | | |
|---|---|---|---|
| 4,672,086 | 6/1987 | Seiler et al. | 524/127 |
| 4,681,915 | 7/1987 | Bates et al. | 525/905 |
| 4,704,430 | 11/1987 | Freitag et al. | 525/67 |
| 4,866,130 | 9/1989 | Brown et al. | 525/67 |

FOREIGN PATENT DOCUMENTS

| | | |
|---|---|---|
| 0170196 | 5/1986 | European Pat. Off. . |
| 51-89558 | 8/1976 | Japan . |
| 51-021664 | 10/1976 | Japan . |
| 52-150466 | 12/1977 | Japan . |
| 56-95948 | 8/1981 | Japan . |
| 5994037 | 6/1982 | Japan . |
| 5994038 | 6/1982 | Japan . |
| 59-159847 | 9/1984 | Japan . |
| 60-65056 | 4/1985 | Japan . |
| 60-84354 | 5/1985 | Japan . |
| 61-73762 | 4/1986 | Japan . |
| 61-145248 | 7/1986 | Japan . |

OTHER PUBLICATIONS

*Plastics Handbook,* "Construction of Plastics, Polymerization, Processing, Properties and Application of Plastics" by Dr. rer. nat. Dipl.-Chem. Adolf Franck, and Prof. Dipl.-Chem. Karlheinz Biederbick.

*Primary Examiner*—James J. Seidleck
*Assistant Examiner*—Thomas Hamilton, III
*Attorney, Agent, or Firm*—Brumbaugh, Graves, Donohue & Raymond

[57] ABSTRACT

A thermoplastic polyester resin composition characterized by comprising
  30-70% by weight of a polyester resin (A) constituted mainly of a polyalkylene terephthalate,
  5-35% by weight of a graft polymer (B) obtained by graft-polymerizing at least one selected from the group consisting of an aromatic vinyl monomer and a methacrylate monomer in the presence of a rubbery polymer, and
  10-45% by weight of a polyphenylene ether resin (C) and
  resulting from blending these polymers so that the content of said polyester resin (A) may be higher than that of said polyphenylene ether resin (C).

3 Claims, 2 Drawing Sheets

F I G. 1
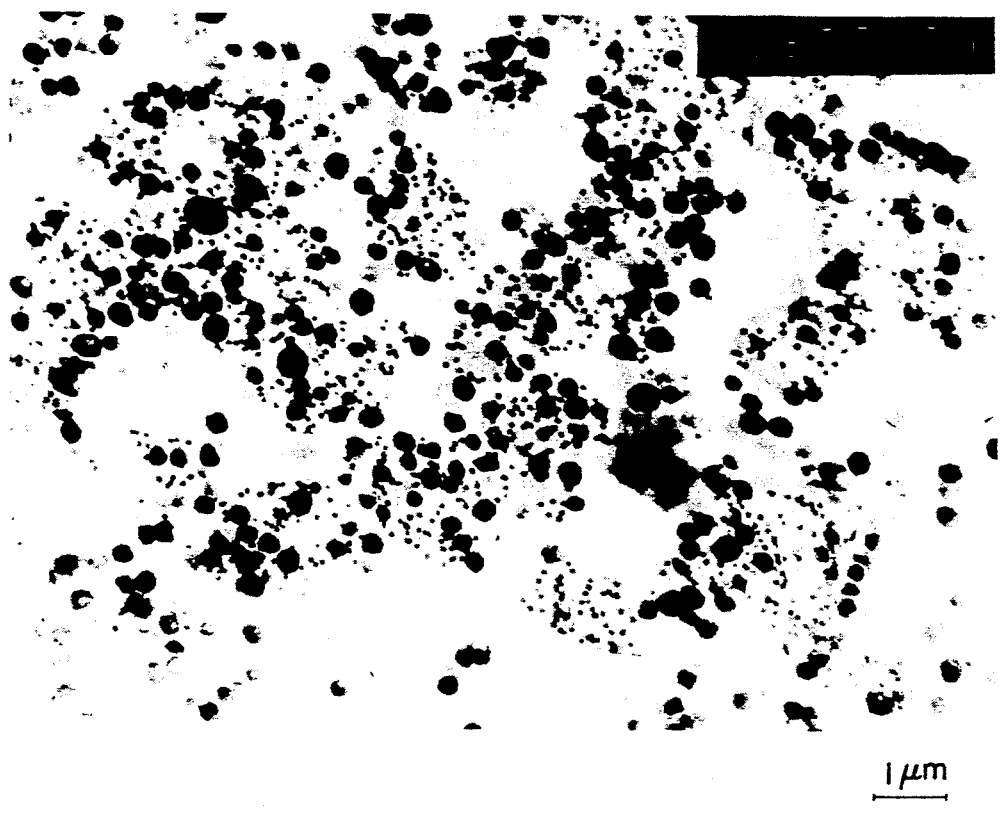
MBS
MBS: PBd ⇔ MMA ⇔ ST
(67) (15) (18)

ABS

ABS : PBd ⇔ AN/ST
(67)  (10)  (23)

THERMOPLASTIC POLYESTER RESIN COMPOUND

This application is a continuation of application Ser. No. 07/418,798, filed on Oct. 4, 1989 now abandoned which, in turn, is a continuation of Ser. No. 189,246 filed Mar. 21, 1988, now abandoned.

TECHNICAL FIELD

The present invention relates to a thermoplastic polyester resin composition which can provide molded articles superior in heat resistance and impact resistance.

BACKGROUND ART

Thermoplastic polyesters, e.g. polyalkylene terephthalates, have superior moldability, mechanical properties, heat stability, weather resistance, and electrical insulating properties, hence being used in extensive areas including those of electrical or electronic parts, automotive parts, etc. However, the application of thermoplastic polyesters are considerably restricted because of the low stiffness at elevated temperatures and the low impact resistance, particularly the inferior notched impact strength.

For instance, it has been investigated to make the most of superior mechanical and thermal properties of thermoplastic polyester resins in order to use them as materials for exterior panels of automobiles for on-line coating production, but such use has not been realized up to now on account of the insufficiency in stiffness at elevated temperatures and in impact resistance. Incorporation of glass fiber, carbon fiber, wollastonite, or the like into thermoplastic polyester resins improves the high-temperature stiffness but has the drawback of lowering further the impact resistance and deteriorating the surface appearance. Blending of thermoplastic polyester resins with a rubber-reinforced resin improves the impact resistance but lowers the heat resistance represented by the high-temperature elastic modulus or the like; hence such blends are unfit for the on-line coating. In addition, since their linear expansion coefficients are large and their molded articles may show notable sink marks at the rib or boss portions, the blends cannot be applied as materials for exterior panels of automobiles. That's the present situations.

On the other hand, Japanese Patent Publication No. 51-21664 discloses that polyethylene terephthalate or polybutylene terephthalate is blended with a polyphenylene ether resin with the object of improving the moldability and processability thereof. However, this blending does not provide products much satisfactory in impact resistance.

DISCLOSURE OF INVENTION

The present inventors made intensive studies to provide a method for improving molded articles of thermoplastic polyester resins in elastic moduli at elevated temperatures, impact resistance, linear expansion coefficient, dimensional stability, etc. while maintaining the moldability and mechanical properties of the resins as such. As a result, it has been found that such objects as stated above can be achieved by blending a polyalkylene terephthalate-based polyester resin with a polyphenylene ether resin and a specific graft copolymer so as to satisfy specific conditions, and the present invention has been accomplished.

That is, the invention is directed to a thermoplastic resin composition characterized by comprising 30–70% by weight of a polyester resin (A) constituted mainly of a polyalkylene terephthalate, 5–35% by weight of a graft polymer (B) obtained by graft-polymerizing at least one selected from the group consisting of an aromatic vinyl monomer and a methacrylate monomer in the presence of a rubbery polymer, and 10–45% by weight of a polyphenylene ether resin (C) and resulting from blending these polymers so that the content of said polyester resin (A) may be higher than that of said polyphenylene ether resin (C).

BRIEF DESCRIPTION OF DRAWINGS

FIG. 1 shows the structure of a molded specimen of the present inventive resin composition by an electron micrograph of an ultra-thin piece cut from the specimen and stained with osmium.

BEST MODE OF CARRYING OUT THE INVENTION

Figure 2:
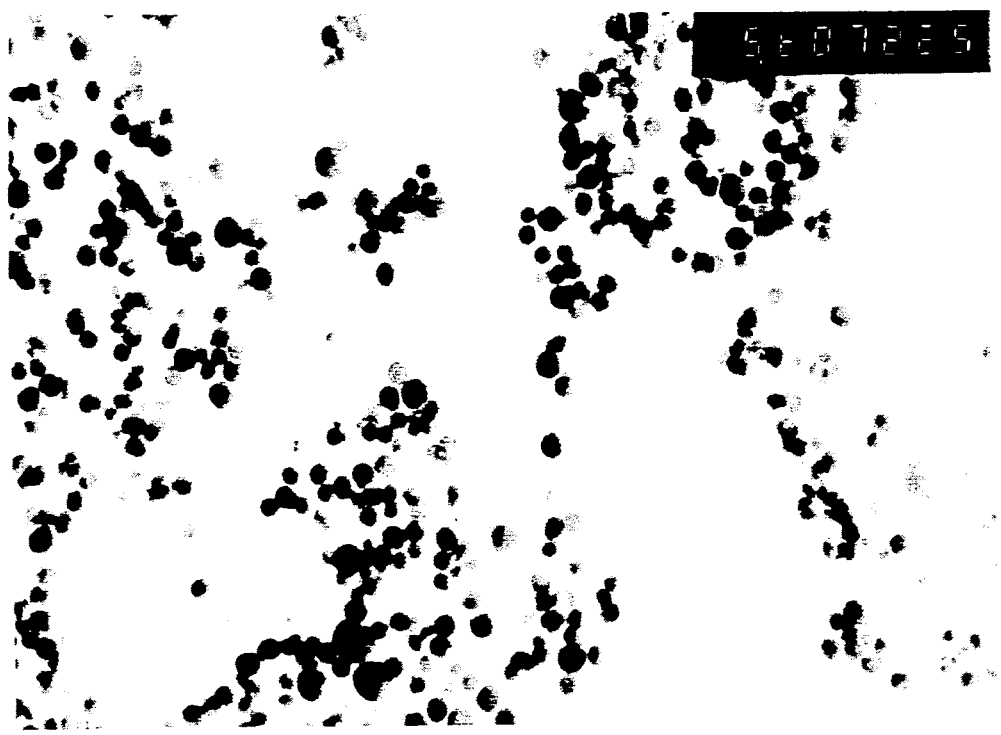
FIG. 2 shows the structure of a molded specimen of a resin composition prepared as a control using acrylonitrile in the production of the graft polymer, by an electron micrograph of an ultra-thin piece cut from the specimen and stained with osmium.

The polyester resin (A) constituted mainly of a polyalkylene terephthalate, in the present invention, is derived chiefly from an aromatic dicarboxylic acid of 8–22 carbon atoms and any of alkylene glycols, cycloalkylene glycols, and aralkylene glycols having 2–22 carbon atoms and may optionally contain a less amount of an aliphatic dicarboxylic acid, e.g. adipic acid or sebacic acid, or of a polyalkylene glycol, e.g. polyethylene glycol or polytetramethylene glycol, as constitutional units. Preferred polyester resins, in particular, include polyethylene terephthalate and polytetramethylene terephthalate. The polyester resins may be used alone or in combination.

A thermoplastic resin composition particularly superior in exhibiting impact resistance can be obtained by making the polyester resin (A) contain a polycarbonate resin in an amount of 5 to 28% by weight based on the whole weight of the present inventive composition comprising the components (A), (B), and (C).

Polycarbonate resins which may be incorporated into the polyester resin (A) in the present invention are derived from dihydroxydiarylalkanes and may be branched if desired. These polycarbonate resins can be produced by known methods, generally by reacting dihydroxy or polyhydroxy compounds with phosgen or diesters of carbonic acid. Suitable dihydroxydiarylalkanes include those having alkyl groups, chlorine atoms or bromine atoms in positions ortho to the hydroxy groups. Preferred examples of the dihydroxy diarylalkane are 4,4'-dihydroxy-2,2-diphenylpropane (=bisphenol A), tetramethylbisphenol A, and bis(4-hydroxyphenyl)-p-diisopropylbenzene. Branched polycarbonate can be produced, for instance, through replacing a part, e.g. 0.2–2 mole %, of the dihydroxy compound by a polyhydroxy compound. Examples of the polyhydroxy compound are 1,4-bis(440 ,4,2'-dihydroxy triphenylmethyl)benzene, phloroglucinol, 4,6-dimethyl2,4,6-tri(4-hydroxyphenyl)heptene, 4,6-dimethyl-2,4,6-tri(4-hydroxyphenyl)heptane, 1,3,5-tri(4-hydroxyphenyl)benzene, 1,1,1-tri(4-hydroxyphenyl)ethane, and 2,2-bis[4,4-(4,4'-dihydroxyphenyl)cyclohexyl]propane.

The polycarbonate resin content in the present inventive composition is desired to be from 5 to 28% by weight of the whole weight of the composition, because less contents thereof than 5% by weight are insufficient for articles molded from the resulting resin composition to exhibit impact resistance and contents thereof exceeding 28% by weight bring about reduction in the stiffness at elevated temperatures.

Moreover, a polyester elastomer and a polyarylate resin can be incorporated into the polyester resin (A) according to performance characteristics requested for the composition. In the case of such a blend, however, the content of the above-said polyalkylene terephthalate needs to occupy at least 60% by weight of the blend composition.

In the present inventive resin composition comprising the components (A) through (C) (hereinafter said composition is referred to as the whole resin composition), the content of the above described polyester resin (A) constituted mainly of a polyalkylene terephthalate is from 30 to 70% by weight. Contents thereof outside this range tend to scarcely provide the resin composition that the invention aims at. Such contents are undesirable.

The raft polymer (B) in the present invention is obtained by graft-polymerizing at least one selected from the group consisting of an aromatic vinyl monomer and a methacrylate monomer in the presence of a rubbery polymer. Preferred examples of the rubbery polymer are; polybutadiene rubber; a copolymer, e.g. a styrene-butadiene copolymer or an acrylonitrile-butadiene copolymer containing at least 50% by weight of butadiene units and a less amount of styrene or acrylonitrile units; polyacrylate rubber such as polybutyl acrylate; polyorganosiloxane rubber; compound rubber such as a two-poly rubbery polymer constructed of polybutadiene particles each provided with an outer layer of polybutyl acrylate or another type of combination of the above rubbery polymer components; and mixtures of these polymers. Graft polymers (B) containing 30–80% by weight of the rubbery polymer are used preferably.

The aromatic vinyl monomer to be used in the graft polymerization is exemplified by styrene and methylstyrene. The methacrylate monomer is exemplified by methyl methacrylate and ethyl methacrylate. These monomers may be used alone or in combination. In carrying out the present invention, less amounts of other copolymerizable monomer may be used in addition to these aromatic vinyl monomers and methacrylate monomers. The other copolymerizable monomers include acrylate monomers such as methyl acrylate and butyl acrylate and maleimide monomers such as N-phenylmaleimide. Vinyl cyanide monomers such as acrylonitrile and methacrylonitrile are undesirable because they tend to lower the impact resistance and high-temperature stiffness of articles molded from the resulting resin composition.

The amounts of aromatic vinyl monomer and methacrylate monomer to be used and the amount of other copolymerizable monomer which may be used optionally for the graft polymerization are adjusted so that the total content of them in the graft copolymer (B) may be in the range of 20 to 70% by weight.

Particularly preferred graft polymers are of a type having styrene units present in the outermost layer of the particles. Such a graft polymer can be obtained by graft-polymerizing styrene in the last stage when the graft polymerization is carried out stepwise or by graft-polymerizing simultaneously a styrene-containing mixture.

The content of the graft polymer (B) in the whole resin composition is from 5 to 35% by weight. When this content is less than 5% by weight, moldings from the resulting resin composition will be inferior in impact resistance and when the content exceeds 35% by weight, the stiffness at elevated temperatures will tend to lower. Hence, such contents are undesirable.

The polyphenylene ether resin (C) in the present invention is a homopolymer or copolymer having repeating units represented by the formula

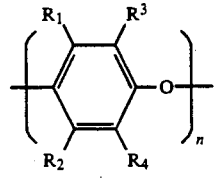

(in the formula, $R_1$, $R_2$, $R_3$, and $R_4$ are selected independently of one another from the group consisting of hydrogen, alkyl groups, halogens, nitro group, and amino group and n denotes a number of at least 30, preferably at least 50).

Examples of such polyphenylene ether resins are poly(2,6-dimethyl-1,4-phenylene) ether, poly(2,3,6-trimethyl-1,4-phenylene) ether, poly(2,6-diethyl-1,4-phenylene) ether, poly(2,6-dipropyl-1,4-phenylene) ether, poly(2-methyl-6-ethyl-1,4-phenylene) ether, poly(2-methyl-6-propyl-1,4-phenylene) ether, poly(2-ethyl-6-propyl-1,4-phenylene) ether, copolymer of (2,6-dimethyl-1,4-phenylene) ether with (2,3,6-trimethyl-1,4-phenylene) ether, copolymer of (2,6-diethyl-1,4-phenylene) ether with (2,3,6-trimethyl-1,4-phenylene) ether, and copolymer of (2,6-dimethyl-1,4-phenylene) ether with (2,3,6-triethyl-1,4-phenylene) ether.

Of these polymers; preferred are poly(2,6-dimethyl-1,4-phenylene) ether, poly(2,3,6-trimethyl-1,4phenylene) ether, and copolymer of (2,6-dimethyl-1,4-phenylene) ether with (2,3,6-trimethyl-1,4-phenylene) ether, particularly preferred are poly(2,6-dimethyl-1,4-phenylene) ether and poly(2,3,6-trimethyl-1,4-phenylene) ether, and the most desirable is poly(2,6-dimethyl-1,4-phenylene) ether. While the polymerization degree of the polyphenylene ether resin used in the present invention is not particularly restricted, those having reduced viscosities of 0.3 to 0.7 dl/g as measured in chloroform solvent at 25° C. are preferably used. Those having lower viscosities than 0.3 dl/g tend to deteriorate the heat stability, while those having viscosities exceeding 0.7 dl/g tend to impair the moldability. The above-cited polyphenylene ether resins may be used alone or in combination.

The content of the polyphenylene ether resin (C) in the whole resin composition is from 10 to 45% by weight. When this content is less than 10% by weight, the high-temperature stiffness of articles molded from the resulting resin composition will not be improved effectively. When the content exceeds 45% by weight, the molded articles will tend to be inferior in impact resistance. Such contents are undesirable.

The thermoplastic polyester resin composition of the present invention is prepared by blending the above described components (A) through (C) so that the contents thereof may lie in the respective ranges defined above. In this case, the blending should be conducted so that the content of the polyester resin, i.e. component (A), may be always higher than that of the polyphenylene ether resin, i.e. component (C), in the whole resin composition and it is desirable that the phase composed mainly of the polyester resin (A) form a matrix phase and the polyphenylene ether resin (C) be dispersed, uniformly in particular, in the form of particles. In addition, a part of the polyphenylene ether resin (C) may form another matrix phase. For the purpose of forming a matrix phase from the polyester resin (A), it is advisable to conduct the blending so that the content of the polyester resin (A) may be always higher than that of the polyphenylene ether resin (C) in the whole resin composition.

On satisfying the above condition, the blending provides a resin composition wherein the polyphenylene ether resin (C) is at least dispersed in particulate form in the polyester resin (A). Moreover, the blending sometimes provides a resin composition in which a part of the polyphenylene ether resin (C) forms another matrix phase.

In view of physical properties, it is also desirable that the graft polymer (B) be present preferentially in the polyphenylene ether resin (C). For achieving such a state, it is desirable to use the above-mentioned graft polymer (B) having styrene units in the outermost layer. Thus, a resin composition is prepared wherein, the polyester resin (A) acts as a matrix, the polyphenylene ether resin (C) either disperses in particulate form in the matrix or forms partly another matrix phase, and the graft polymer (B) is present preferentially in the polyphenylene ether resin (C), thereby improving moldings of the polyester resin in properties such as elastic moduli at elevated temperatures, impact resistance, linear expansion coefficient, dimensional stability, and heat resistance while maintaining the moldability and mechanical properties inherent in the polyester resin. It may be noted that moldability will be greatly lowered and impact resistance does not develop at all when the polyester resin (A) is dispersed in particulate form in a phase of the polyphenylene ether resin (C).

As occasion demands, various additives may be suitably incorporated into the thermoplastic resin composition of the present invention. Such additives include flame retardants, modifiers, mold release agents, light or heat stabilizers, reinforcing fillers, dyes and pigments, etc.

For preparing the thermoplastic resin composition of the present invention, it is possible to use common resin blenders including Henschel mixers, tumblers, and the like. For the shaping, there may be used common molding machines such as single-screw extruders, twin-screw extruders, and injection molding machines.

EXAMPLES

The present invention is illustrated in more detail with reference to the following examples. In the following descriptions, the term "part(s)" means "part(s) by weight" unless otherwise noted.

In the examples and comparative examples, properties were evaluated in the following ways.

(1) Izod impact strength

Measured under conditions of 23° C. and 50% R.H. in accordance with ASTM D-256. (unit: kg·cm/cm) (notched test pieces ¼ inch thick and ⅛ inch thick were used.)

(2) Rockwell hardness

Measured in accordance with ASTM D-785. (unit: R scale)

(3) Elastic modulus

The values of test pieces ⅛ inch thick, ½ inch wide, and 18 mm long at 150° C., expressed in "Flex Storage", were determined by using "DMA (model 982)", an instrument supplied by E.I. Du Pont de Nemours & Co. (unit: $kg/cm^2$)

(4) Linear expansion coefficient

Using "TMA", an instrument for measuring linear expansion coefficient supplied by Seiko Instruments Inc., test pieces 3 mm thick, 5 mm wide, and 10 mm long were heated from 30° to 70° C., where the linear expansion coefficient over the above temperature range were determined. (unit: mm/°C.)

(5) Mold shrinkage factor

The values of ASTM dumbell test pieces were determined which were molded by using an injection molding machine "Model DM-100" supplied by Meiki Co., Ltd. at a cylinder temperature of 260° C. and a mold temperature of 60° C. (unit: %)

(6) Heat sag test

Using test pieces ⅛ inch thick, ½ inch wide, and 5 inch long, a one-hour heat sag test was conducted under conditions of 100-mm overhang and 160° C., where the sag (mm) of each test piece was measured. (unit: mm)

The polyphenylene ether resin used in the examples and comparative examples is a copolymer of (2,6-dimethyl-1,4-phenylene) ether with (2,3,6-trimethyl-1,4-phenylene) ether, which has a reduced viscosity ( sp/c) of 0.59 dl/g as measured on a 0.1% chloroform solution at 25° C. by using an Ubbellohde viscometer. The polytetramethylene terephthalate used has an intrisic viscosity $[\eta]$ of 1.05.

Other resins used are as follows:

Polycarbonate resin: NOVAREX 7025" (tradename), supplied by Mitsubishi Chemical Industries Ltd.

Polyester elastomer: "Pelprene 40H" (tradename), supplied by TOYOBO Co., Ltd.

Ethylene-Propylene-non conjugated diene copolymer (EPDM): "Esprene TPE 808" (tradename), supplied by Sumitomo Chemical Co., Ltd.

Styrene-Butadiene block copolymer (SBS): "Cariflex TR-1184" (tradename), supplied by Shell Chemical Co.

REFERENCE EXAMPLE 1

Preparation of Graft Polymer-I

A reaction vessel was charged with 59 parts (as solids) of a polybutadiene latex of 33 wt % solid content having an average particle diameter of 0.08 μm. Further, 1 part (as solids) of a copolymer latex having an average particle diameter of 0.08 μm, the copolymer consisting of 85 wt % of n-butyl acrylate units and 15 wt % of methacrylic acid units, was added with stirring at room temperature, and stirring was continued for 30 minutes to give a particle-enlarged polybutadiene rubber latex having an average particle diameter of 0.28 μm. Then the air in the reaction vessel was replaced by nitrogen, and 50 parts of distilled water, 0.2 part of Demol N (tradename, a naphthalenesulfonic acid-formalin condensate supplied by Kao Corporation), 0.02 part of sodium hydroxide, and 0.35 part of dextrose were added to the particle-enlarged polybutadiene rubber latex with stirring. The mixture was heated to 60° C., where 0.05 part of ferrous sulfate and 0.2 part of sodium pyrophosphate were added and then a mixture of 24 parts of styrene, 16 parts of methyl methacrylate, and 0.2 part of cumene hydroperoxide was added dropwise continuously over 60 minutes. After this addition had been finished, the reaction mixture was maintained as such for 1 hour to complete the graft polymerization. The mixture was cooled, and the resulting graft polymer latex was coagulated with dilute sulfuric acid according to the ordinary method. The coagulum was washed, filtered, and dried, giving a graft polymer-I.

REFERENCE EXAMPLE 2

Preparation of Graft Polymer-II

50 Parts of distilled water, 0.2 part of Demol N, 0.02 part of sodium hydroxide, and 0.35 part of dextrose were added with stirring to 65 parts (as solids) of the particle-enlarged polybutadiene rubber latex obtained in the preparation of graft polymer-I. The mixture was heated to 60° C., where 0.05 part of ferrous sulfate and 0.2 part of sodium pyrophosphate were added and then a mixture of 20 parts of styrene and 0.2 part of cumene hydroperoxide was added dropwise over 60 minutes. Subsequently, a mixture of 15 parts of methyl methacrylate and 0.1 part of cumene hydroperoxide was added dropwise in 30 minutes. After finish of this addition, the reaction mixture was maintained as such for 1 hour. The mixture was cooled, and the resulting graft polymer latex was coagulated with dilute sulfuric acid according to the ordinary method. The coagulum was washed, filtered, and dried, giving a graft polymer-II.

REFERENCE EXAMPLE 3

Preparation of Graft Polymer-III

A graft polymer-III was prepared according to the procedure of preparing the graft polymer-I except that 10 parts of styrene, 25 parts of methyl methacrylate, and 5 parts of butyl acrylate were used in place of a total of 40 parts of 24 parts styrene and 16 parts methyl methacrylate.

REFERENCE EXAMPLE 4

Preparation of Graft Polymer-IV

A reaction vessel was charged with 60 parts (as solids) of a polyorganosiloxane latex of 33 wt % solid content having an average particle diameter of 0.156 μm. While replacing the air in the reaction vessel with nitrogen, the latex was heated to 70° C., where 40 parts of styrene and 0.2 part of tert-butyl hydroperoxide were added with stirring. Further a solution of 0.12 part of Rongalite (tradename) 0.0002 part of ferrous sulfate, and 0.0006 part of sodium ethylenediaminetetraacetate in 10 parts of water was added to initiate the polymerization. After the exothermic reaction had terminated, the reaction was continued for 2 hours. Then the mixture was cooled and the resulting graft polymer latex was coagulated with calcium chloride. The coagulum was washed, filtered, and dried, giving a graft polymer-IV.

REFERENCE EXAMPLE 5

Preparation of Graft Polymer-V

A graft polymer-V was prepared according to the procedure of preparing the graft polymer-I except that 28 parts of styrene and 12 parts of acrylonitrile were used in place of a total of 40 parts of 24 parts styrene and 16 parts methyl methacrylate.

REFERENCE EXAMPLE 6

Preparation of Graft Polymer-VI

50 Parts of distilled water, 0.2 part of Demol N, 0.02 part of sodium hydroxide, and 0.35 part of dextrose were added with stirring to 67 parts (as solids) of the particle-enlarged polybutadiene rubber latex obtained in the preparation of graft polymer-I. The mixture was heated to 60° C., where 0.05 part of ferrous sulfate and 0.2 part of sodium pyrophosphate were added and then a mixture of 15 parts of methyl methacrylate and 0.2 part of cumene hydroperoxide was added dropwise over 60 minutes. Subsequently, a mixture of 18 parts of styrene and 0.2 part of cumene hydroperoxide was added dropwise over 60 minutes. After finish of this addition, the reaction mixture was maintained as such for 1 hour. The mixture was cooled and the resulting graft polymer latex was coagulated with dilute sulfuric acid according to the ordinary method. The coagulum was washed, filtered, and dried, giving a graft polymer-VI.

REFERENCE EXAMPLE 7

Preparation of Graft Polymer-VII

50 Parts of distilled water, 0.2 part of Demol N, 0.02 part of sodium hydroxide, and 0.35 part of dextrose were added with stirring to 67 parts (as solids) of the particle-enlarged polybutadiene rubber latex obtained in the preparation of graft polymer-I. The mixture was heated to 60° C., where 0.05 part of ferrous sulfate and 0.2 part of sodium pyrophosphate were added and then a mixture of 10 parts of acrylonitrile, 23 parts of styrene, and 0.3 part of cumene hydroperoxide was added dropwise over 120 minutes. After finish of this addition, the reaction mixture was maintained as such for 1 hour. The mixture was cooled, and the resulting graft polymer latex was coagulated with dilute sulfuric acid according to the ordinary method. The coagulum was washed, filtered, and dried, giving a graft polymer-VII.

EXAMPLES 1-13 AND COMPARATIVE EXAMPLES 1-8

The aforementioned polytetramethylene terephthalate, polyphenylene ether resin, polyester elastomer, polycarbonate resin, EPDM, SBS, and graft polymers-I through V prepared in Reference Examples 1-5 were mixed in proportions shown in Tables 1 and 2 by using a Henschel mixer. The resulting blends were each melt-mixed through a 30-mmφ twin-screw extruder at a cylinder temperature of 260° C. and formed into pellets.

These different kinds of pellets were dried, and injection-molded at a cylinder temperature of 260° C. and a mold temperature of 60° C., preparing test pieces for evaluations. Results of the evaluations are shown in Tables 1 and 2.

In Comparative Examples 2-4, each resin composition employed another rubbery polymer in place of the graft polymer defined according to the present invention. In Comparative Examples 5 and 6, the resin compositions employed a graft polymer which, dissimilarly to the graft polymer defined according to the invention, was prepared by using acrylonitrile as a grafting monomer.

As is evident from results shown in Tables 1 and 2, the present inventive resin composition provides molded articles superior in the balance of various properties such as impact resistance, high-temperature elastic modulus, linear expansion coefficient, and heat resistance.

EXAMPLE 14 AND COMPARATIVE EXAMPLE 9

The aforementioned polytetramethylene terephthalate, polyphenylene ether resin, polycarbonate resin, and graft polymers-VI and VII prepared in Reference Examples 6 and 7, respectively, were weighed out in proportions shown in Tables 1 and 2, and were mixed, extruded, and pelletized in the same manner as in Example 1. Pellets of each group were injection-molded similarly to Example 1. Results of evaluating the molded test pieces are shown in Tables 1 and 2.

FIGS. 1 and 2 show respective transmission-type electron micrographs of ultra-thin pieces cut from molded specimens of the resin compositions of Example 14 and Comparative Example 9.

The present inventive composition, as compared with that of Comparative Example 9, is much superior in impact resistance and exhibits high heat resistance in the heat sag test. This is considered to be attributable to the fundamental difference between the polymer dispersion structure, as shown in FIG. 1, in the present inventive composition and the polymer dispersion structure, as shown in FIG. 2, in the composition of the comparative example. That is, the great beneficial effect of the present invention is exhibited when the phase comprising mainly polytetramethylene terephthalate forms a matrix phase and the graft copolymer is present preferentially in the polyphenylene ether phase, as shown in FIG. 1. In this case, the polyphenyelne ether forms either a dispersed phase or further another matrix phase.

In FIGS. 1 and 2, notations mean as follows: MBS: Graft polymer-VI, ABS:" Graft polymer-VII, PBd: Polybutadiene rubber, MMA: Methyl methacrylate, ST: Styrene, AN: Acrylonitrile. Numerals indicate the respective proportions (% by weight) of components.

TABLE 1

| | | Example 1 | Example 2 | Example 3 | Example 4 | Example 5 | Example 6 | Example 7 |
|---|---|---|---|---|---|---|---|---|
| A | Polytetramethylene terephthalate (parts) | 55 | 50 | 45 | 60 | 40 | 40 | 50 |
| | Polyester elastomer (parts) | | 5 | | | 5 | | |
| | Polycarbonate resin (parts) | | | 15 | 10 | 10 | 10 | 10 |
| B | Graft polymer-I (parts) | 15 | | | | | | 10 |
| | Graft polymer-II (parts) | | 20 | | | 15 | | 5 |
| | Graft polymer-III (parts) | | | 15 | | | 10 | |
| | Graft polymer-IV (parts) | | | | 10 | | | |
| | Graft polymer-V (parts) | | | | | | | |
| | Graft polymer-VI (parts) | | | | | | | |
| | Graft polymer-VII (parts) | | | | | | | |
| C | Polyphenylene ether resin (parts) | 30 | 25 | 25 | 20 | 30 | 40 | 25 |
| Physical property | Izod impact strength, ¼ inch (kg·cm/cm) | 6 | 9 | 15 | 10 | 16 | 8 | 15 |
| | Izod impact strength, ⅛ inch (kg·cm/cm) | 7 | 11 | 25 | 15 | 28 | 12 | 25 |
| | Rockwell hardness (R scale) | 112 | 108 | 110 | 111 | 109 | 112 | 110 |
| | Elastic modulus (kg/cm$^2$) | 4500 | 4000 | 4500 | 4000 | 4500 | 5500 | 4500 |
| | Linear expansion coefficient (mm/°C.) | $7.9 \times 10^{-5}$ | $8.1 \times 10^{-5}$ | $8.2 \times 10^{-5}$ | $8.3 \times 10^{-5}$ | $8.0 \times 10^{-5}$ | $7.9 \times 10^{-5}$ | $8.0 \times 10^{-5}$ |
| | Mold shrinkage factor (%) | 1.3 | 1.2 | 1.2 | 1.3 | 1.1 | 1.0 | 1.2 |
| | Heat sag test (mm) | 2 | 3 | 6 | 4 | 6 | 3 | 5 |

| | | Example 8 | Example 9 | Example 10 | Example 11 | Example 12 | Example 13 | Example 14 |
|---|---|---|---|---|---|---|---|---|
| A | Polytetramethylene terephthalate (parts) | 48 | 45 | 35 | 60 | 40 | 43 | 38 |
| | Polyester elastomer (parts) | | | | | | | |
| | Polycarbonate resin (parts) | 7 | 5 | 25 | 15 | 15 | 12 | 17 |
| B | Graft polymer-I (parts) | 15 | | | | | 10 | |
| | Graft polymer-II (parts) | | 20 | | | 15 | 10 | |
| | Graft polymer-III (parts) | | | 15 | | | | |
| | Graft polymer-IV (parts) | | | | 10 | | | |
| | Graft polymer-V (parts) | | | | | | | |
| | Graft polymer-VI (parts) | | | | | | | 20 |
| | Graft polymer-VII | | | | | | | |

TABLE 1-continued

| | | | | | | | | |
|---|---|---|---|---|---|---|---|---|
| | (parts) | | | | | | | |
| C | Polyphenylene ether resin (parts) | 30 | 30 | 25 | 15 | 30 | 25 | 25 |
| Physical property | Izod impact strength, ¼ inch (kg · cm/cm) | 10 | 11 | 20 | 10 | 15 | 15 | 20 |
| | Izod impact strength, ⅛ inch (kg · cm/cm) | 9 | 11 | 25 | 15 | 28 | 25 | 30 |
| | Rockwell hardness (R scale) | 112 | 108 | 110 | 111 | 109 | 110 | 108 |
| | Elastic modulus (kg/cm$^2$) | 4500 | 4000 | 4500 | 4000 | 4500 | 4000 | 4000 |
| | Linear expansion coefficient (mm/°C.) | $7.8 \times 10^{-5}$ | $8.0 \times 10^{-5}$ | $8.0 \times 10^{-5}$ | $8.1 \times 10^{-5}$ | $7.9 \times 10^{-5}$ | $8.2 \times 10^{-5}$ | $8.3 \times 10^{-5}$ |
| | Mold shrinkage factor (%) | 1.2 | 1.1 | 1.1 | 1.3 | 1.2 | 1.1 | 1,2 |
| | Heat sag test (mm) | 4 | 4 | 7 | 5 | 6 | 5 | 6 |

TABLE 2

| | | Compar. Example 1 | Compar. Example 2 | Compar. Example 3 | Compar. Example 4 | Compar. Example 5 |
|---|---|---|---|---|---|---|
| A | Polytetramethylene terephthalate (parts) | 100 | 80 | 55 | 60 | 40 |
| | Polyester elastomer (parts) | | 10 | | | 5 |
| | Polycarbonate resin (parts) | | | | 5 | 10 |
| B | Graft polymer-I (parts) | | | | | |
| | Graft polymer-IV (parts) | | | | | |
| | Graft polymer-V (parts) | | | | | 15 |
| | Graft polymer-VII (parts) | | | | | |
| | EPDM (parts) | | 10 | | 10 | |
| | SBS (parts) | | | 15 | | |
| C | Polyphenylene ether resin (parts) | | | 30 | 25 | 30 |
| Physical property | Izod impact strength, ¼ inch (kg · cm/cm) | 2 | 2 | 1 | 2 | 7 |
| | Izod impact strength, ⅛ inch (kg · cm/cm) | 3 | 3 | 3 | 4 | 12 |
| | Rockwell hardness (R scale) | 119 | 108 | 110 | 108 | 109 |
| | Elastic modulus (kg/cm$^2$) | 2500 | 2000 | 4500 | 4000 | 4000 |
| | Linear expansion coefficient (mm/°C.) | $10.4 \times 10^{-5}$ | $9.5 \times 10^{-5}$ | $8.5 \times 10^{-5}$ | $8.5 \times 10^{-5}$ | $8.0 \times 10^{-5}$ |
| | Mold shrinkage factor (%) | 2.0 | 2.0 | 1.3 | 1.4 | 1.1 |
| | Heat sag test (mm) | 4 | 7 | 3 | 3 | 12 |

| | | Compar. Example 6 | Compar. Example 7 | Compar. Example 8 | Compar. Example 9 |
|---|---|---|---|---|---|
| A | Polytetramethylene terephthalate (parts) | 50 | 43 | 25 | 38 |
| | Polyester elastomer (parts) | | | | |
| | Polycarbonate resin (parts) | 10 | 12 | 10 | 17 |
| B | Graft polymer-I (parts) | | | 10 | |
| | Graft polymer-IV (parts) | | | | |
| | Graft polymer-V (parts) | 15 | 10 | | |
| | Graft polymer-VII (parts) | | | | 20 |
| | EPDM (parts) | | | | |
| | SBS (parts) | | 10 | | |
| C | Polyphenylene ether resin (parts) | 25 | 25 | 55 | 25 |
| Physical property | Izod impact strength, ¼ inch (kg · cm/cm) | 5 | 5 | 3 | 8 |
| | Izod impact strength, ⅛ inch (kg · cm/cm) | 10 | 6 | 4 | 8 |

| | | | | |
|---|---|---|---|---|
| TABLE 2-continued | | | | |
| Rockwell hardness (R scale) | 110 | 110 | 113 | 108 |
| Elastic modulus (kg/cm$^2$) | 4500 | 4000 | 6000 | 4000 |
| Linear expansion coefficient (mm/°C.) | $8.1 \times 10^{-5}$ | $8.3 \times 10^{-5}$ | $7.9 \times 10^{-5}$ | $8.3 \times 10^{-5}$ |
| Mold shrinkage factor (%) | 1.2 | 1.1 | 1.3 | 1.2 |
| Heat sag test (mm) | 11 | 11 | 3 | 8 |

INDUSTRIAL APPLICABILITY

Thus, the resin composition of the present invention has a construction as described hereinbefore, thereby being capable of providing molded articles superior in the balance of various properties such as impact resistance, high-temperature elastic modulus, linear expansion coefficient, dimensional stability, and heat resistance. Such great beneficial effects are achieved by the present inventive resin composition.

We claim:

1. A thermoplastic polyester resin composition comprising 30-70% by weight of a polyester resin (A) comprising a polyalkylene terephthalate in an amount effective to provide heat stability, said polyalkylene terephthalate comprising a polycarbonate resin (D) in an amount of 5-28% by weight based on the weight of said thermoplastic polyester resin composition;

5-35% by weight of a graft polymer (B) obtained by graft-polymerizing at least one selected from the group of an aromatic vinyl monomer in the presence of a butadiene homopolymer rubber, and a methacrylate monomer in the presence of a butadiene homopolymer rubber followed by graft-polymerizing an aromatic vinyl monomer;

10-45% by weight of a polyphenylene ether resin (C), said resin (C) being a homopolymer or copolymer having repeating units represented by the formula

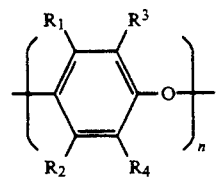

wherein $R_1$, $R_2$, $R_3$ and $R_4$ are selected independently from the group consisting of hydrogen, an alkyl group, halogens, a nitro group, and an amino group; and wherein n is a number greater than or equal to 30; and wherein the weight % of said polyester resin (A) is greater than that of said polyphenylene ether resin (C) and the weight % of the rubbery polymer in the graft polymer (B) is from 30 to 80% by weight based on the weight of said graft polymer (B).

2. The thermoplastic polyester resin composition of claim 1, wherein n is a number greater than or equal to 50.

3. The thermoplastic polyester resin composition of claim 1, wherein said graft polymer (B) is present in said polyphenylene ether resin (C).

* * * * *